May 13, 1930.  J. R. GOODWIN  1,758,440
ADJUSTABLE POST BRACKET
Original Filed Feb. 13, 1924
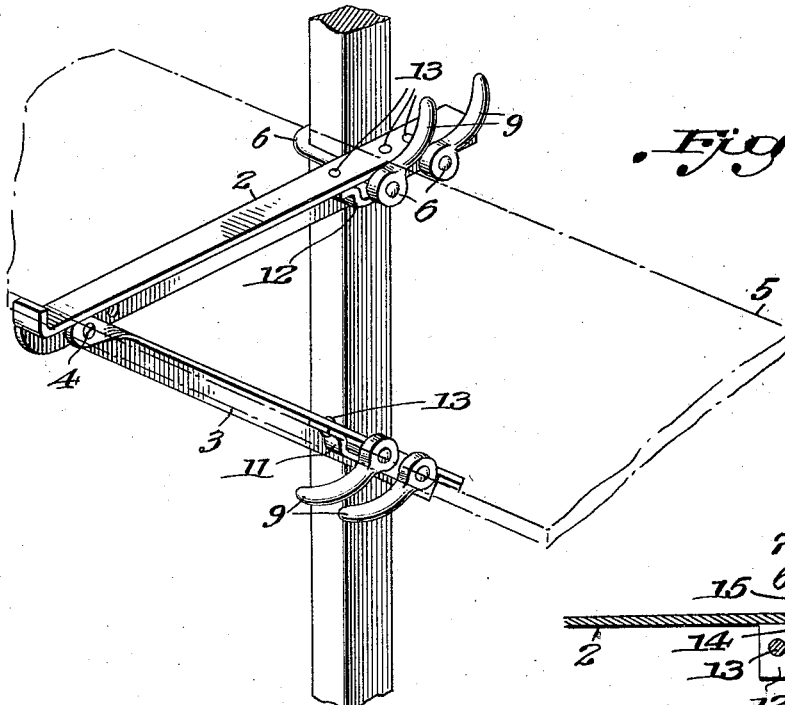
Fig. 1.
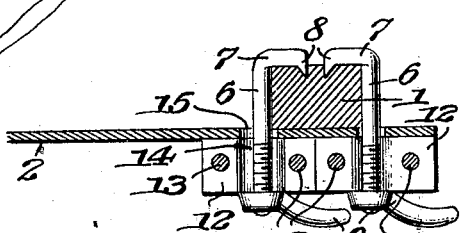
Fig. 3.
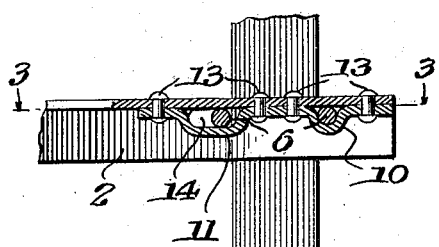
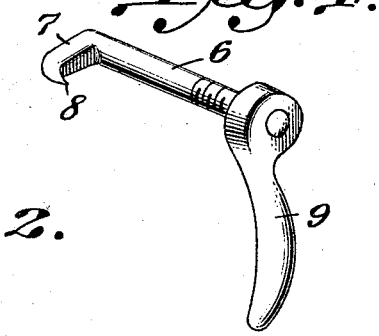
Fig. 4.
Fig. 2.
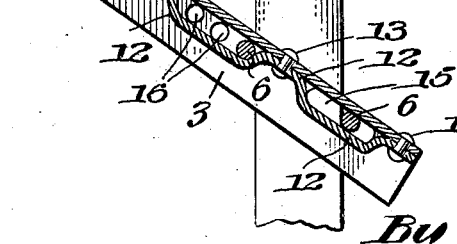
Inventor;
James R. Goodwin, Deceased.
Percy E. Goodwin and
Walter C. Goodwin.
Administrators.
By Patented May 13, 1930

1,758,440

UNITED STATES PATENT OFFICE

JAMES R. GOODWIN, DECEASED, LATE OF EVANSVILLE, INDIANA, BY PERCY E. GOODWIN AND WALTER C. GOODWIN, ADMINISTRATORS, OF EVANSVILLE, INDIANA, ASSIGNORS TO THE STEEL SCAFFOLDING COMPANY, OF EVANSVILLE, INDIANA, A CORPORATION OF INDIANA

ADJUSTABLE POST BRACKET

Original application filed February 13, 1924, Serial No. 692,574. Divided and this application filed May 12, 1927. Serial No. 190,924.

This invention relates to brackets of that general class which are adapted to be clamped to a post for use in the construction of gas tanks, oil tanks, and other constructions or installations where a bracket of this general character is needed.

The object of the invention is to provide a simple, strong, and durable foldable post bracket of improved construction provided with novel means for attaching it to the post and holding it in any desired position thereon, without possibility of accidental slippage or of wabbling, and adaptability for quick and easy adjustment or removal.

The invention also comprehends the improved clamping or fastening device which is used in connection with the bracket.

The bracket and the clamping or fastening devices thereof are so constructed and arranged that the bracket may be applied to any post of the usual sizes employed in construction work.

The bracket is so constructed that it may be folded into compact arrangement so as to be readily carried about without occupying much space.

In the following specification and the accompanying drawings there is set forth one embodiment of the invention. It will be understood, however, that modifications may be resorted to within the spirit and scope of the invention.

In the accompanying drawings:

Figure 1, is a perspective view showing the bracket applied to a post, dotted lines representing the manner in which a plank may be laid on the bracket;

Fig. 2, is a detail vertical section through the arm and brace of the bracket, showing the adaptability of the clamps for adjustment;

Fig. 3, is a detail cross section on the line 3—3, Fig. 2; and

Fig. 4, is a detail perspective view of one of the clamps, shown alone.

The fragment of a post such as commonly used in the construction of gas tanks, oil tanks, and other scaffolds used for erection purposes, is shown at 1 to illustrate the manner of use of the bracket which is shown applied thereto.

The bracket is of metal and is complete and self-contained, ready for adjustment to any post such as that shown at 1. The bracket has an arm 2 and a brace 3 which are of angle-iron construction for purposes of strength, the two being jointed together on the screw threaded bolt 4. When the bracket is in use, the arm 2 is adapted to support a plank, shown in dotted lines at 5, it being understood that the plank runs from a bracket on one post to a corresponding bracket on another post, in the usual manner.

The arm 2 and brace 3 are detachably and adjustably secured to the post by clamps of the construction shown in Fig. 4. Each of these clamps comprises a threaded L-shaped bolt 6 having a hooked head 7 provided with a point 8 adapted to penetrate the post 1 in the manner shown in Fig. 3. An internally screw threaded nut 9, preferably provided with a handle, is engaged with the screw threads on the shank 6 so that by turning this nut the arm and brace may be securely connected to the post 1.

To provide for a wide bearing on the shank 6 for the purpose of preventing canting of the clamp bolts, the bearing plates 10 and 11 are provided on the arm 2 and the bearing plate 12 is secured to the brace 3. Rivets 13 are preferably employed for fastening the bearing plates 10, 11, 12.

The shank of the right hand bolt for the arm 2 need not be adjusted in the direction of the length of the arm. If it is desired to provide for adjustment of the shank of the left hand bolt for the arm 2, the bearing plate 12 is elongated as shown at 14 and there is provided an elongated hole or slot 15 in the vertical web of the arm 2. Thus, the arm is rendered adaptable for application to posts 1 of different sizes.

The clamp bolts which secure the brace 3 are preferably adjustable to adapt them to posts of different sizes, hence both bearing plates 12 are elongated. An elongated slot 15 in the vertical web of the brace 3 is provided for adjustment of the right hand clamp bolt. The left hand clamp bolt of the brace 3 may be inserted in any one of the series of holes 16 in the vertical web of brace 3. In all instances, the provision of the bearing plates prevents twisting or canting of the bolts; and the edges of the bearing plates, together with the edges of the arm 2 and brace 3, afford a suitably wide bearing for the nuts 9 so that the clamp bolts may be turned up very tightly, causing the arm and brace to be securely held against the post.

Whereas provision is shown for adjustment of the bolts in the direction of the length of the arm and brace, it is to be understood that, unless specified in the claim, the invention is not limited to the provision of means affording this adjustment.

The clamp bolts being disposed transversely of the arm and brace and there being two in each instance, the bracket will support very heavy weights as the bolts cannot give way unless they are completely sheared off; and because the weight supported by the bracket is applied crosswise of the bolts, instead of lengthwise thereof, there is no danger of the threads of the bolts being stripped by the weight.

This application is a division of Serial No. 692,574 filed February 13, 1924.

What is claimed is:

In a bracket for use on wooden posts, the combination with an arm of angle-iron, of a brace therefor which is of angle-iron, and means for independently securing the arm and the brace to the post, comprising in one instance screw-threaded bolts whose shanks pass through one web of the brace and are spaced apart to adapt them to lie on opposite sides of the post, and in the other instance screw-threaded bolts whose shanks pass through one web of the arm, and are spaced apart to adapt them to lie on opposite sides of the post, said screw-threaded bolts each having a post-penetrating point at one end and a nut at the other end, bearing plates being secured to the webs of the arm and brace, respectively, and serving as mountings for the shanks of the screw bolts and as abutments for the nuts aforesaid.

In testimony whereof we affix our signatures.

PERCY E. GOODWIN.
WALTER C. GOODWIN.
*Joint Administrators of the Estate of James R. Goodwin, Deceased.*